July 15, 1941.  J. T. POTTER  2,249,324
MULTIPLE RECORDER
Filed Aug. 26, 1938    2 Sheets-Sheet 1

INVENTOR
John T. Potter
BY Alfred W. Barber
ATTORNEY

July 15, 1941.                    J. T. POTTER                      2,249,324
                                MULTIPLE RECORDER
                              Filed Aug. 26, 1938                 2 Sheets-Sheet 2
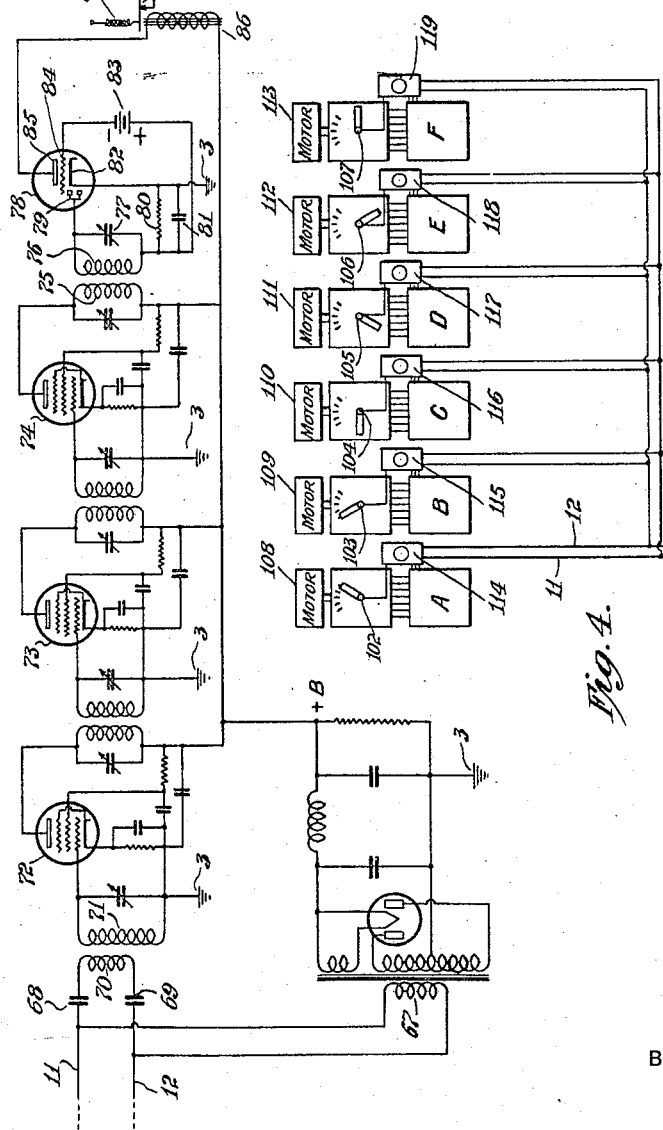
Fig. 3.
Fig. 4.
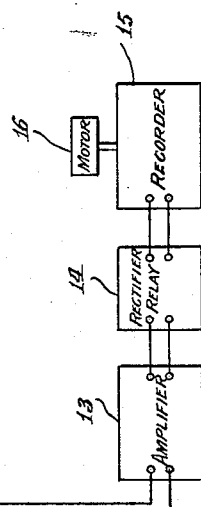
INVENTOR
John T. Potter
BY Alfred W. Barber
ATTORNEY Patented July 15, 1941

2,249,324

UNITED STATES PATENT OFFICE 2,249,324

MULTIPLE RECORDER

John T. Potter, Brooklyn, N. Y.

Application August 26, 1938, Serial No. 226,909

2 Claims. (Cl. 234—67)

The present invention concerns recording systems and in particular systems for making permanent records of the operation of a plurality of radio receivers.

An object of the present invention is to provide methods of and means for making a permanent record on a single record sheet of the operation of a plurality of separately operated radio receivers.

Another object is to monitor the operation of a plurality of radio receivers and to transmit the information obtained to a central recording point by means of a readily available medium as for instance power wires emanating from the central point.

A further object is to provide simple but effective terminal apparatus for the various receivers and the central station.

A particular object is to provide a method of and means for synchronizing the operation of the monitors at the receivers and of forming an easily interpreted record of all receiver operations on a single record sheet at the central station.

In my co-pending applications Serial Nos. 112,450 and 218,142 entitled "Recording device for radio receivers" and "Radio recorder" filed Nov. 24, 1936, and July 8, 1938, respectively are shown recording devices for recording the operation of a single radio receiver. The present system utilizes certain of the devices disclosed in the above cited applications as will be pointed out below.

In the past various types of recording devices have been used for a number of purposes. However, in recording the dial setting or other operations of radio receivers only a few rather unsatisfactory devices have been proposed. This is probably due to the delicacy and peculiarities of operation of radio receivers. Several devices have been shown using a pen or pencil marking on a record sheet and moved by a mechanical linkage coupled to the tuning dial. These devices are quite unsatisfactory for quantity application to radio receivers on account of their large size and general complexity. In the co-pending applications cited above are shown greatly improved, electrically operated recording devices easily attached to a large number of radio receivers. In one of these devices a selector switch is attached to the radio receiver tuning condenser shaft and recording is performed on a paper tape or card by one of a number of electro-thermal or electro-chemical styli as determined by the position of the selector switch. The other of these devices utilizes the oscillator frequency of a superheterodyne receiver to actuate a recorder which continuously searches with a rotating tuning element and records on a suitable surface a predetermined number of frequencies.

It has been found that by combining certain features of the above two systems and adding elements that it is possible to utilize a single record sheet to record the operation of 40 to 50 radio receivers. In one embodiment of the present invention a selector switch is attached to each receiver, and each point of the selector switch is connected to a segment of a commutator in which the segments are grouped and cover only a small fraction of the circumference of a circle. An arm riding around the commutator and driven by a synchronous motor turns on a fixed frequency oscillator when it contacts a segment corresponding to a closed contact of the selector switch due to the radio tuning condition. Commutator arms at the various radio receivers are adjusted to different phases so that only one commutator is traversed by an arm at a given interval. The receivers and particular stations being received are recorded at a central point on a time differentiation basis. Each receiver has its own fixed frequency oscillator and it is proposed to transmit a signal from this oscillator to the central station over a convenient medium such as power or light wire. At the central station a fixed frequency amplifier builds up the received signals to operate a recording mechanism. A preferred form of recorder consists of a large drum revolving once a minute and driving a recording point the length of the drum once each 24 hours. The operation of each receiver associated with the central station is recorded once for each revolution of the drum. It has been found that 40 receivers may be recorded on an 8 inch diameter drum.

The invention may be more fully understood from the following detailed description when taken in conjunction with the figures of the drawings.

Fig. 3 shows a circuit diagram of one form of central station system.

Fig. 4 shows a block diagram illustrating the phase relations of a number of commutator arms.

Figure 1:
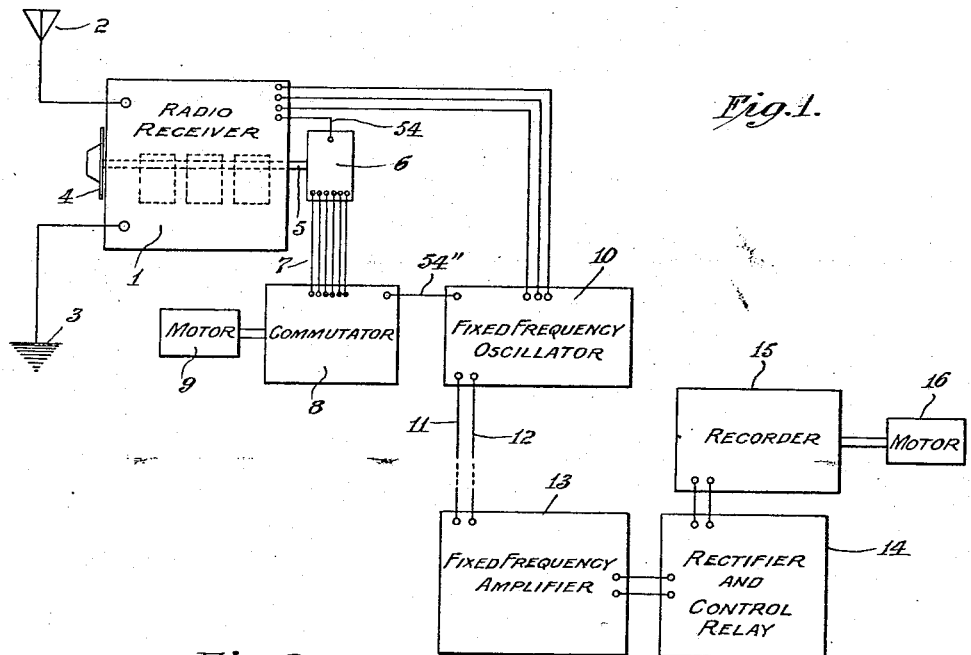
Fig. 1 shows a block diagram of one form of the invention.

In Fig. 1 is shown a radio receiver 1 attached to an antenna 2 and ground 3. The receiver is tuned by a dial 4 connected to a condenser shaft 5. The shaft 5 operates selector 6 which connects one of wires 7 to commutator 8 whenever a predetermined station is tuned in on the radio receiver. Commutator 8 is swept by an arm driven by synchronous motor 9 phased to cooperate with other commutators in the system. When the arm of commutator 8 connects with a commutator segment energized by selector 6 over wires 7 the fixed frequency oscillator 10 is energized and an impulse of oscillator voltage is transmitted over line 11—12 which may be the local power or light line.

At a convenient central point also connected to line 11—12 is a central recording station consisting of a fixed frequency amplifier 13, a rectifier and control relay 14, and a recorder 15 driven by a synchronous motor 16. The amplifier 13 is tuned to the frequency of oscillator 10 and serves to amplify the received impulses of oscillator voltage to a point permitting operation of a rectifier and relay 14. The rectifier converts the amplified oscillator voltage impulses into direct current impulses which in turn operate a control relay. The control relay 14 serves to turn on or off current energizing a pen or other recording means in recorder 15. A complete system may comprise 40 or 50 radio receivers including selectors, commutators and oscillators and one central station comprising one amplifier, rectifier, relay and recorder. The 40 or 50 commutators are all driven by synchronous motors from a common power source and are relatively phased so that at a given instant only one commutator arm is traversing its commutator segments. The central station recorder is driven by a synchronous motor from the same power source as the commutators and a record is produced in which receivers and stations are distinguished on a special basis on the record.

Figure 2:
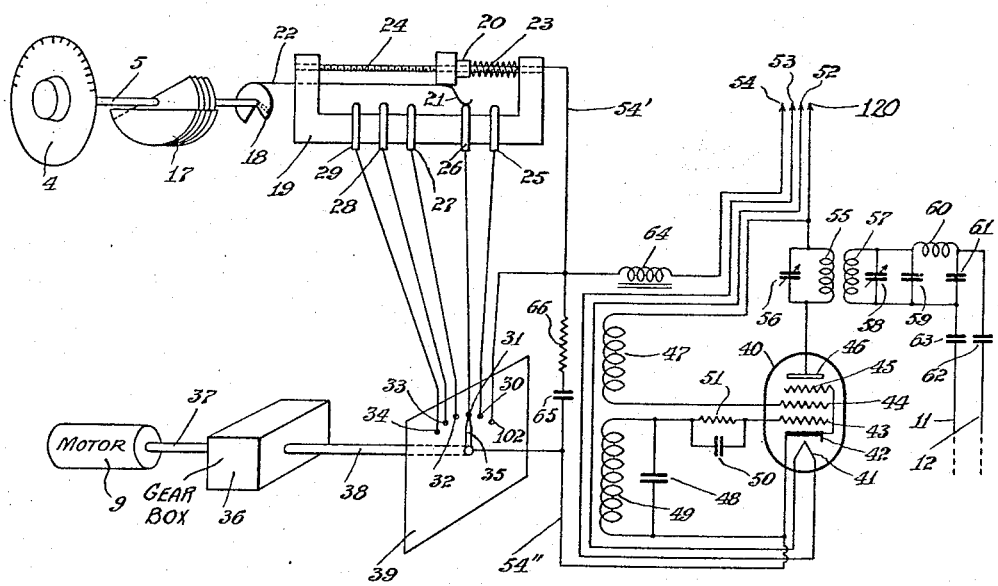
Fig. 2 shows a circuit diagram of the receiver attachment portion of the invention.

Fig. 2 shows circuit details of one form of selector, commutator and oscillator which is used at each radio receiver upon which data is to be taken. Dial 4 is shown turning shaft 5 for tuning the radio receiver by means of attached condenser 17. On this same shaft 5 is attached a pulley 18 for operating selector 19. Selector 19 comprises a plunger 20 carrying variable contact 21. Flexible cable 22 attached to pulley 18 and plunger 20 serves to pull contact 21 over the selector contacts 25, 26, 27, 28 and 29. Tension spring 23 around guide rod 24 is attached to plunger 20 and body 19 and serves to return plunger 20 when pulley 18 is reversed. Contacts 25, 26, 27, 28 and 29 are wired to commutator 39 segments 30, 31, 32, 33 and 34 respectively. Commutator arm 35 serves to contact the segments and is rotated by synchronous motor 9 thru a suitable speed reduction gear box 36 and shafts 37 and 38. Thus selector 19 and commutator 39 cooperate to complete circuit 54' to 54" at one position of commutator arm 35 provided contact 21 is in contact with one of the contacts 25, 26, 27, 28 or 29. Contacts 25, 26, 27, 28 and 29 are adjusted on body 19 to correspond to positions of condenser 17 corresponding to radio stations the reception of which is to be recorded. At each revolution of commutator arm 35 circuit 54'—54" will be closed at a unique time corresponding to the selector position. If motor 9 is a non-self-starting motor a temporary power failure will result in permanently stopping the recorder signal generating unit. If a self-starting motor were used the unit would again send out signals after a temporary failure but these signals would be useless since the phase relation would not be correct.

One method of transmitting the information obtained from the selector and commutator cooperation is to cause circuit 54'—54" to turn on an oscillator and transmit the oscillator voltage over power or light lines 11—12. For this purpose oscillator tube 40 is shown comprising heater 41, cathode 42, control grid 43, screen grid 44, suppressor grid 45 and plate 46. The oscillator circuit includes grid coil 49 tuned by condenser 48 to a desired frequency as for instance 300 kilocycles. Grid coil 49 is connected between cathode 42 and control grid 43 thru grid resistor 51 by-passed by grid condenser 50. Feed-back to provide oscillation is supplied by plate coil 47 connected between screen grid 44 and a source of plate voltage 120 which may be the receiver the operation of which is being recorded. This is an electron coupled circuit with suppressor grid 45 connected to cathode 42 and an output tuned circuit comprising coil 55 tuned to the operating frequency by adjustable condenser 56 connected between plate 46 and plate voltage source 120. The output is fed to line 11—12 thru a harmonic suppressor system comprising coil 57 coupled magnetically to coil 55 and tuned to the operating frequency by adjustable condenser 58 and low-pass filter comprising coil 60 and condensers 59 and 61. Condensers 62 and 63 couple the output of the filter to line 11—12 and at the same time isolate the power or light frequency voltage on the line. Heater 41 may be supplied from the receiver the operation of which is being recorded over wires 52 and 53. The ground return from the receiver supplied by wire 54 goes thru the selector and commutator on wires 54' and 54" to the oscillator cathode 42 and when this circuit is closed as described above the oscillator is energized sending an impulse of oscillator high frequency voltage into line 11—12. In order to eliminate a steep wave front which may be undesirable in the system a choke 64 is included in line 54—54' and a condenser 65 in series with a resistor 66 is shunted across the contactor part of the system. This also reduces sparking of the commutator contacts. Since condenser 65 and resistor 66 suppress sharp impulses which may cause clicking sounds in the radio receiver they may be called a click filter.

Fig. 3 shows a circuit of one form of central station including a fixed frequency amplifier, rectifier, control relay, and recorder. The amplifier comprises amplifier tubes 72, 73 and 74 although more or less tubes than these may be used. The first amplifier tube 72 receives signals over line 11—12 thru coupling condensers 68 and 69 and a transformer comprising primary 70 and secondary 71. Line 11—12 it will be understood is a continuation or branch of the line 11—12 of Fig. 2. In case this is a power line the primary 67 of the central station power supply may also be connected to line 11—12.

Amplifier including tubes 72, 73 and 74 is conventional and is tuned to the frequency of the oscillator shown in Fig. 2. The tuning should be broad enough to still respond to the oscillator even if it drifts slightly with time or due to changes in temperature, humidity or line voltage.

Amplifier output tube 74 feeds a transformer comprising primary 75 and secondary 76. Secondary 76 is tuned by condenser 77 and feeds a diode rectifier comprising diode plates 79 and cathode 82. The diode output circuit includes load resistance 80 by-passed for high frequencies by condenser 81. The rectified voltage drop across resistor 80 is applied to grid 84 of triode 82—84—85 of diode-triode tube 78 thru bias battery 83. The triode plate 85 feeds a relay coil 86 actuating relay armature 87 closing contact 89. Spring 88 opens relay 86 when the plate current drops due to a received signal thru the amplifier. Contact 89 normally closed completes a circuit including secondary 90 of transformer 90—91 and pen lifting coil 92. Transformer 90—91 may be a power frequency transformer with primary 91 connected to power line 11"—12" which may be the same as line 11—12. Voltage across secondary 90 energizes pen lifting coil 92 keeping pen lifting armature 93 closed as long as contact 89 is closed. On armature 93 is mounted a pen 94 or other suitable marking means: When armature 93 drops due to gravity or a spring not shown, pen 94 contacts a record sheet 99 on recording drum 101 and produces a mark. Drum 101 and hence record sheet 99 are rotated slowly by a synchronous motor 100. Pen 94 is moved along the drum by a feed screw 95 driven from drum 101 by sprockets or pulleys 98 and 96 by chain or belt 97. Thus marks are produced on record sheet 99 each time an impulse of oscillator voltage is received over line 11—12. If drum 101 revolves at the same rate as commutator 35 of Fig. 2 marks will be produced in columns on the record sheet corresponding to positions of contactor 21 of Fig. 2.

Fig. 4 shows a block diagram of a complete system with six receivers and associated units and a single central station recorder. Receiver installations A, B, C, D, E and F each include a selector, commutator and fixed frequency oscillator as shown in Figs. 1 and 2. In the case of six receivers, for instance, commutator segments may be placed 10 degrees apart so that five segments occupy 50 degrees of arc. Commutator arms 102, 103, 104, 105, 106 and 107 are driven by synchronous motors 108, 109, 110, 111, 112 and 113 all on the same power system and are phased 60 degrees apart as shown. Oscillators 114, 115, 116, 117, 118 and 119 controlled by these commutators are coupled to line 11—12 or branches of it as is central station amplifier 13. As shown in Figs. 1 and 2 the central station is completed by rectifier-relay unit 14, and recorder 15 driven by synchronous motor 16. If the recorder drum is driven at the same rate as the commutator arms the record sheet will be formed in six columns each column corresponding to a single receiver commutator and each column will be divided into five sub-columns each corresponding to a single receiver selector point. Thus a record will be produced which may be analyzed to show the frequencies of operation of all six receivers.

While not intended to limit the invention the following constants have been found satisfactory:

Drum and commutator speeds, 1 revolution per minute.
Pen travels length of drum in 24 hours.
Receivers to one central station, 40.
Drum diameter, 8 inches.

In general the signal received from the various receiver positions at the central recorder will vary considerably due to different distances and similar causes. Making the recorder pen mark with equal strength regardless of the received impulse strength has been found useful. One of the easiest ways to produce equal marking strength is to allow the pen to fall onto the record sheet due to gravity. This mode of operation is shown in Fig. 3.

In order to produce a record of all stations being received which by subtraction indicates the sum of all undesired stations received an additional signal contact 102 as shown in Fig. 2 is used.

While one embodiment of the present invention has been shown and described it is not intended to limit the invention except within the spirit and scope of the invention as set forth in the claims.

What is claimed is:

1. In a recorder adapted to record the operation of a plurality of tunable carrier wave receivers and the operation at any one of a plurality of predetermined tuning points, the combination of, a plurality of similar commutators each including a number of fixed contactor segments and a rotatable contactor, a non-self-starting synchronous motor connected to a source of alternating current for driving each of said rotatable contactors at the same rate of rotation but at a differing instantaneous position with respect to said segments and for preventing further operation of said commutator upon temporary failure of said current source, means for energizing one segment of each commutator thru means energizing a tunable carrier wave receiver associated with each of said commutators, an adjustable multi-point selector switch associated with each of said receivers for energizing other of said segments of said associated commutators at predetermined tuning points of said receivers, means for generating electrical impulses from said energized commutator segments, and means for recording said impulses.

2. In a recording system adapted to record the time of operation of a plurality of radio receivers on any of a number of predetermined channels and the time of operation of said receivers regardless of channels on a common record sheet, a plurality of signal generators each including, a switch to operate from a radio receiver tuning device, a movable contactor for completing a circuit thru said switch, a plurality of adjustable contacts to cooperate with said contactor at any desired condition of operation of said tuning device, a multi-point commutator driven by a synchronous motor for determining a predetermined sequence of signal generation during relatively short equally spaced intervals of time, a signal source requiring electrical energy to generate signals, circuits for supplying electrical energy from a source of electrical energy thru said switch and said commutator to generate signals characteristic of the operation of said receiver on said predetermined channels, an additional circuit for supplying electrical energy from said source thru said commutator excluding said switch to generate signals indicating the operation of said receiver regardless of channels wherein said signal generators are phased progressively to produce signals spaced in time in a predetermined manner relative to any of the remaining signal generators, and at a remote point a recorder for recording said signals from a plurality of said signal sources on a common record sheet against a time base.

JOHN T. POTTER.